United States Patent [19]
Conway

[11] Patent Number: 5,444,476
[45] Date of Patent: Aug. 22, 1995

[54] SYSTEM AND METHOD FOR TELEINTERACTION

[75] Inventor: Lynn Conway, Ann Arbor, Mich.

[73] Assignee: The Regents of the University of Michigan, Ann Arbor, Mich.

[21] Appl. No.: 989,126

[22] Filed: Dec. 11, 1992

[51] Int. Cl.⁶ .............................................. H04N 7/15
[52] U.S. Cl. ........................................ 348/15; 348/16
[58] Field of Search ................... 379/53, 54, 202, 96, 379/97, 98; 358/85, 86; H04N 7/14, 7/15; 348/13, 14, 15

[56] References Cited

U.S. PATENT DOCUMENTS

| | | | |
|---|---|---|---|
| 4,400,724 | 8/1983 | Fields . | |
| 4,430,526 | 2/1984 | Brown | 379/53 |
| 4,516,156 | 5/1985 | Fabris | 358/85 |
| 4,650,929 | 3/1987 | Buerger | 379/54 |
| 4,656,654 | 4/1987 | Dumas . | |
| 4,686,698 | 8/1987 | Tompkins | 379/53 |
| 4,961,211 | 10/1990 | Tsugane | 379/54 |
| 4,974,173 | 11/1990 | Stefik et al. . | |
| 4,995,071 | 2/1991 | Weber | 379/53 |
| 5,025,314 | 6/1991 | Tang et al. . | |
| 5,239,373 | 8/1993 | Tang et al. | 348/14 |

FOREIGN PATENT DOCUMENTS

| | | | |
|---|---|---|---|
| 158182 | 9/1984 | Japan | H04N 7/14 |
| 267888 | 3/1990 | Japan | H04N 7/14 |
| 97188 | 4/1990 | Japan | H04N 7/15 |
| 192380 | 7/1990 | Japan | H04N 7/14 |

OTHER PUBLICATIONS

*Toward an Open Shared Workspace: Computer and Video Fusion Approach of Teamworkstation*, Communications of the ACM, Hiroshi Ishii and Naomi Miyake, Dec. 1991 pp. 37–50.

*Primary Examiner*—James J. Groody
*Assistant Examiner*—Chris Grant
*Attorney, Agent, or Firm*—Harness, Dickey & Pierce

[57] ABSTRACT

Systems and methods for performing teleinteractive video teleconferencing between two or more teleconference sites, and for enabling any number of teleconference sites to overlay a pointer to point within the video image originating from any teleconference site. The systems and methods employ at least one video imaging device to capture images at a local teleconference site and N display devices to display images captured at the local and the remote teleconference sites, where N is the total number of teleconference sites comprising the system. The teleinteractive capability is accomplished when a local teleconference site selectively inputs the video imaging signal from a remote teleconference site into a pointer overlay device rather than the local video image. The pointer overlay device then overlays the pointer and the overlaid video signal is then transmitted to the remote teleconference sites. Finally, by providing remote control means to actively position the video imaging device at a remote site, the position of the overlaid pointer within a displayed image can be used to reposition a video imaging device at a remote teleconference site.

58 Claims, 9 Drawing Sheets

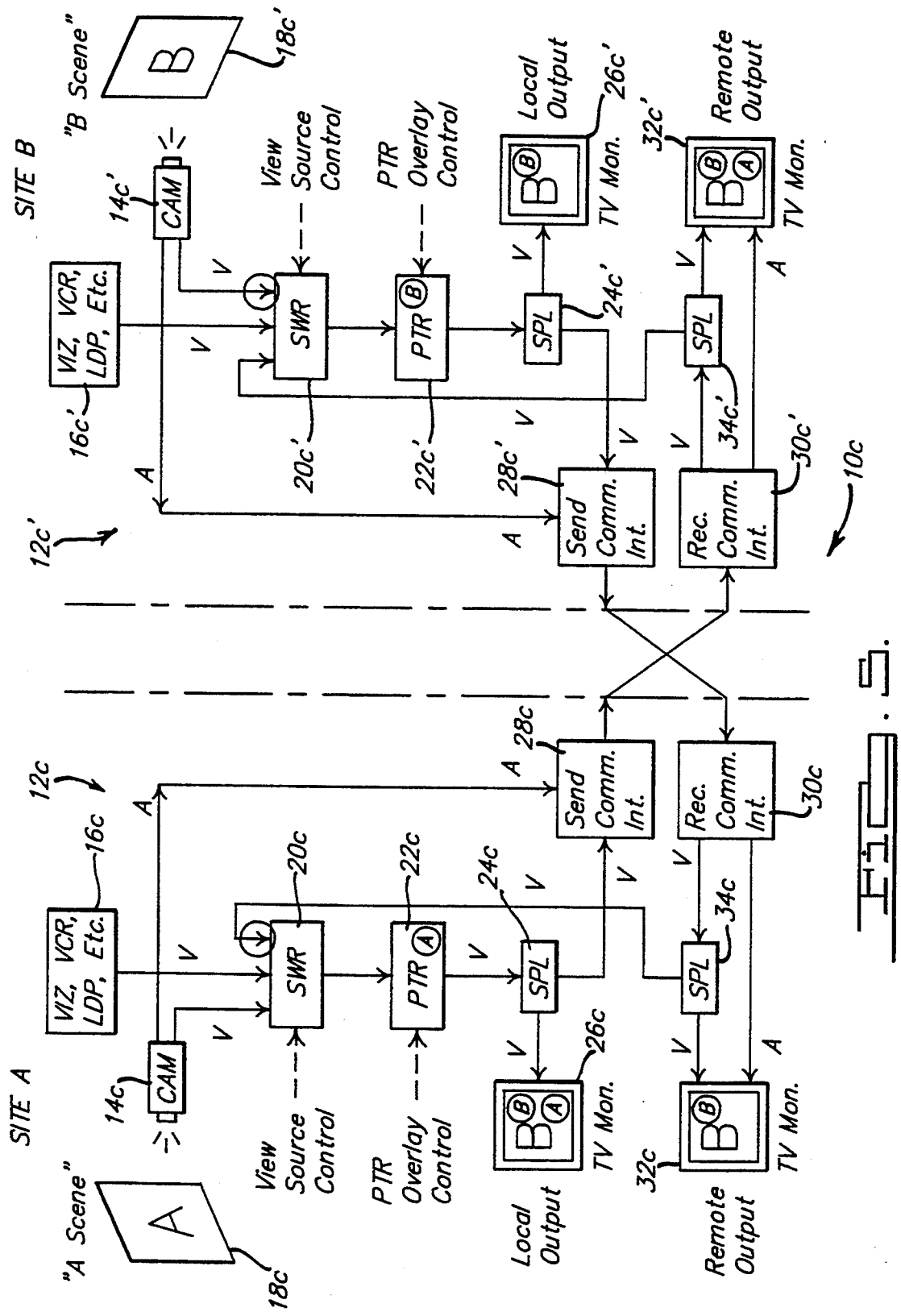

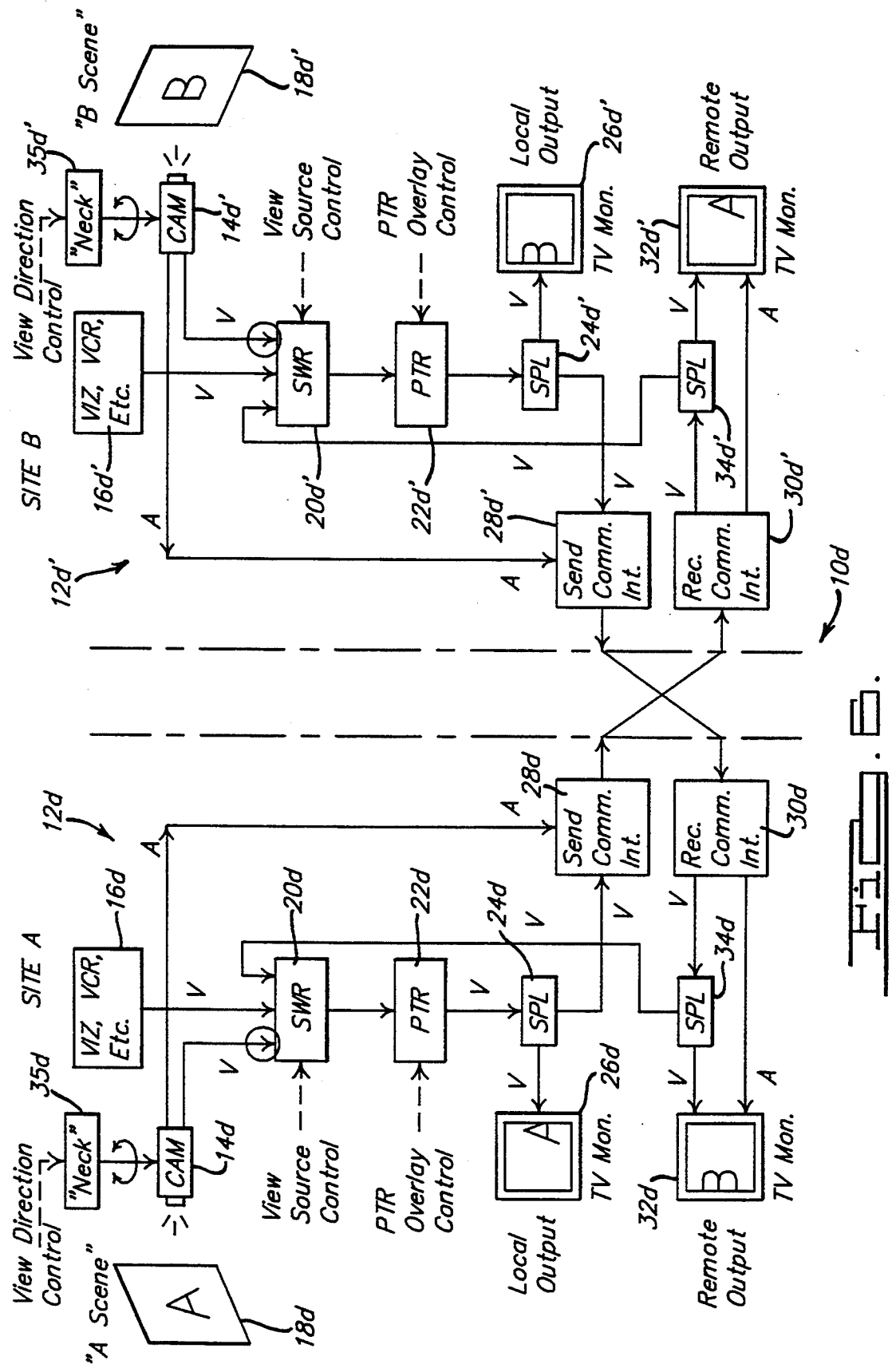

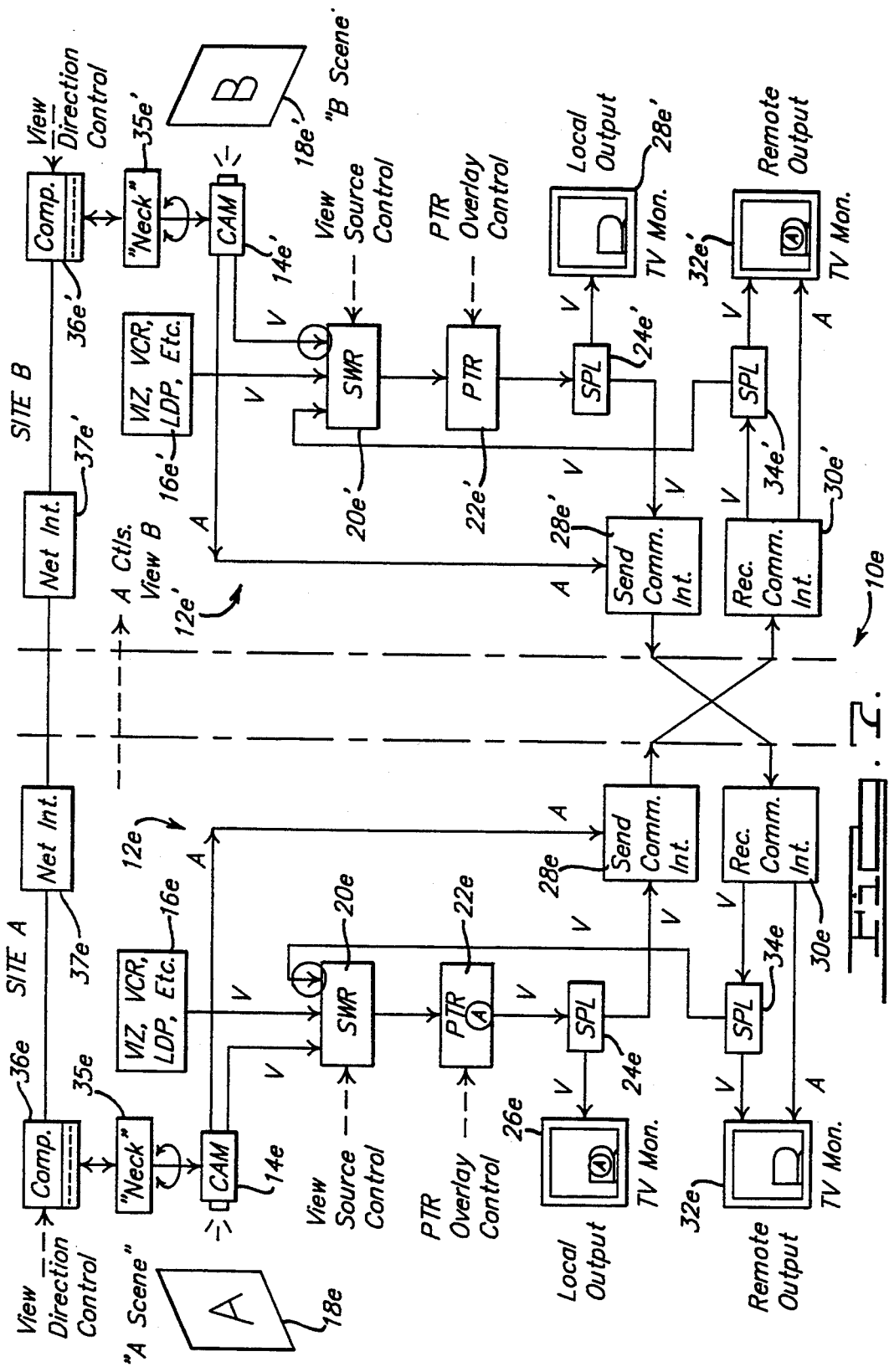

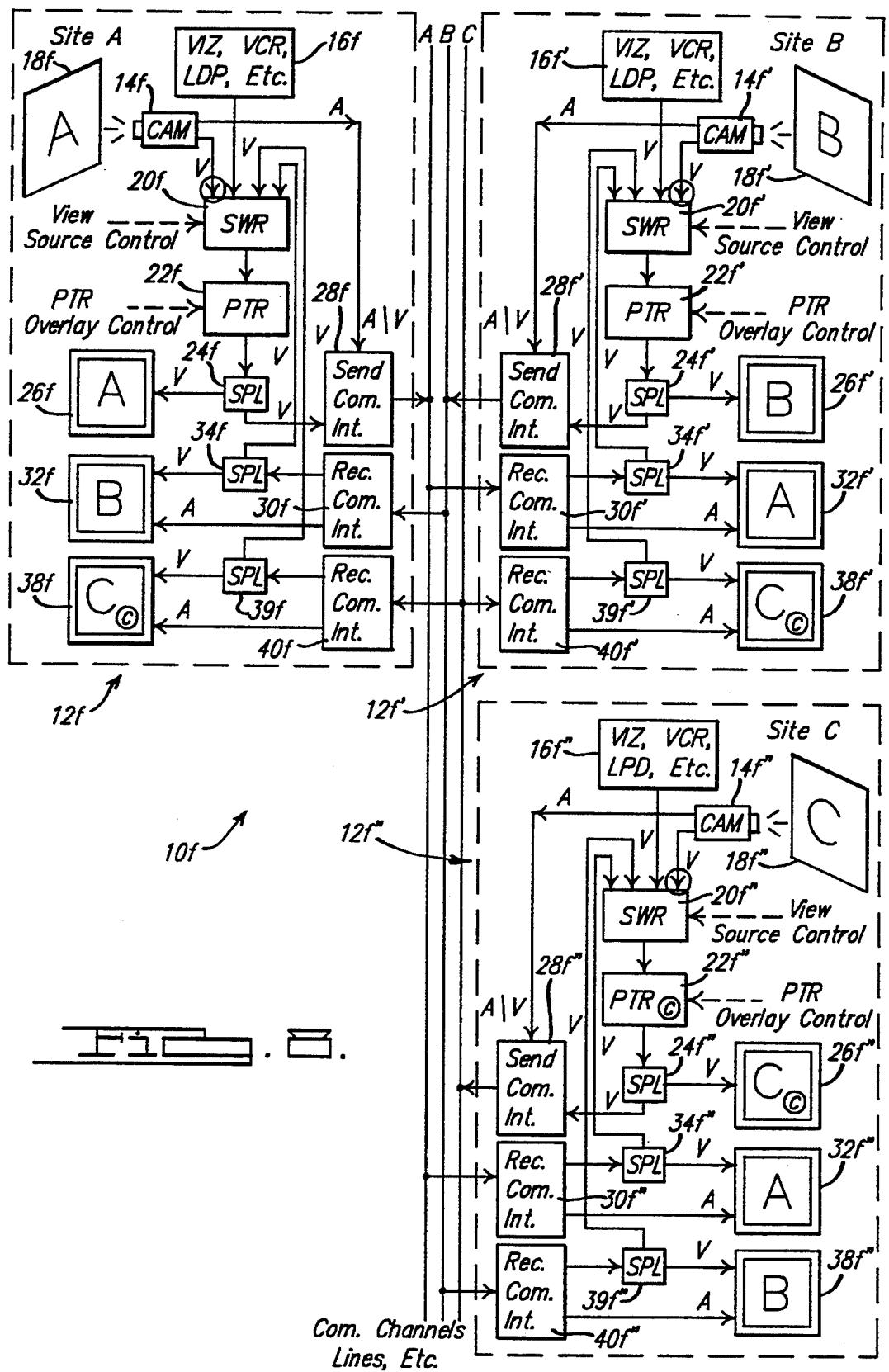

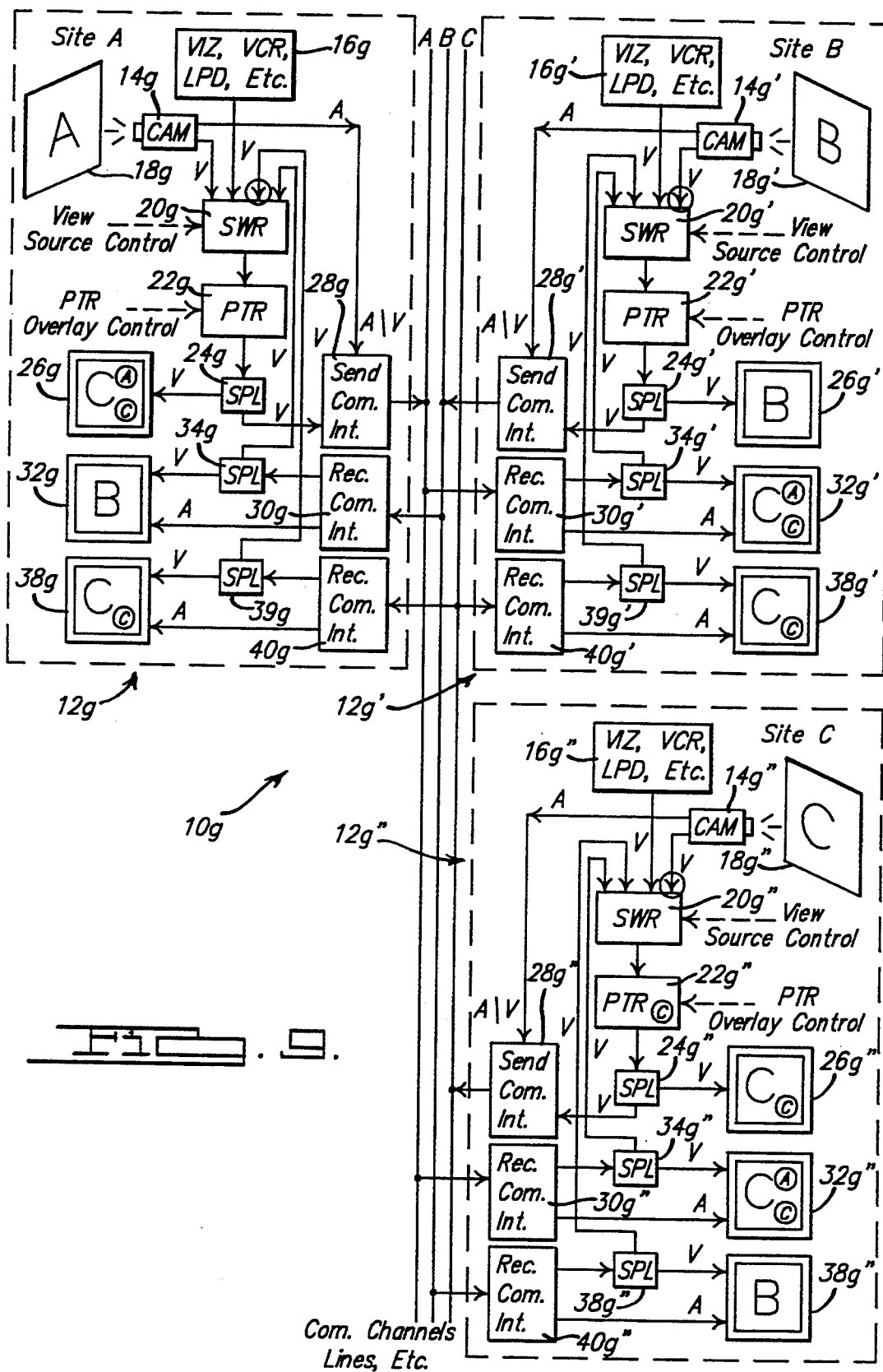

SYSTEM AND METHOD FOR TELEINTERACTION

This invention relates generally to a system and method enabling users at video teleconference sites located remotely to each other to, refer to and point within the same video image whether it originates at a local site or a remote site.

BACKGROUND OF THE INVENTION

When two people have a need to communicate the exchange of information and/or ideas, it is often useful that they do so in a face to face meeting in which they may simultaneously view and discuss particular documents or tangible objects of interest. Oftentimes, however, such a face to face meeting is impractical as the two or-more people desiring to meet are often located in different cities, opposite sides of the same city, or even separate buildings in a large office complex. The time and expense required for travel often makes it impractical and inconvenient to bring all involved parties together in one location. Furthermore, it may be necessary for all parties to meet for only a short time making it even less practical to bring all interested parties together. In such a situation, it is often useful to take advantage of the technology enabling video teleconferencing (to be referred to herein as teleconferencing) of all involved parties.

If two parties are to participate in a teleconference, each conferee will have placed at their local site a video camera to capture images at their local site, a TV monitor to display video images from a remote site, a microphone to capture the local audio portion of a teleconference site, and a speaker to broadcast the audio portion originating from a remote teleconference site. The result is that a conferee at a local site may view the conferee at the remote site, while at the same time the conferee at the remote site may view the conferee at the local site. The audio portion of the teleconference will be transmitted by the microphone and speaker components. While the above system is described for two teleconference sites, greater than two teleconference sites may be accommodated by providing at each site one monitor, for every teleconference site along with one loud speaker, and one microphone. A conferee would be able to view each and every other conferee.

One utilization of such a teleconference system is that should a local conferee wish to display to the other teleconference sites a particular drawing or diagram, the conferee would put that drawing or diagram in front of the camera for display to other sites, and in some systems would be able to refer to specific items within that drawing or diagram. However, one disadvantage of present teleconference systems is that the other conferees are unable to specifically point at or place markings on particular objects within that drawing or diagram. They are limited to merely verbally describing the object to which they wish to refer within a drawing or diagram. Thus, current methods of video teleconferencing fail to disclose any apparatus by which any of the remote conferees may point at or mark specific items within a remote drawing or diagram.

Several attempts have been made at enabling conferees to point simultaneously to a drawing or diagram which is being viewed by each of the other conferees. While they will be described herein, it should be noted initially that each of the below described systems typically approach the problem using computer imaging as compared to actual images captured by video cameras. One such attempt at enabling conferees to simultaneously point within a drawing employs writing surfaces, such as wall mounted white boards or similar systems that include a translucent screen on which a local conferee may write and on which remote video images are projected from behind. A video camera is placed on the back side of a translucent screen to capture any makings or shadows falling upon the screen. Similarly obtained images from the other teleconference sites are then combined with the local image to form a composite image projected onto the backside of each of teleconference screen. This system is defined as a whiteboard system. Such a system requires proper ambient lighting in order to provide a limited three dimensional view of the user. The system does allow users at remote sites to simultaneously refer to specific items appearing on the translucent screen; however, these images are merely monochrome shadows on a translucent screen and, at best provide a limited degree of three dimensional perspective on the translucent screen. None of the inherent advantages of video teleconferencing are present using a whiteboard system. No color presentation may be made and only very limited three dimensional imaging may occur. Furthermore, a sufficient ambient light condition is required at each teleconference site in order to properly backlight the whiteboard user.

A second approach employed in the prior art is to use a shared workspace to overlay digitized video images on a computer screen. The shared workspace is implemented by devoting a computer screen to the process of producing multiple windows and/or overlaying of images obtained from a varied combination of possible sources including computer simulations and digitized signals from devices such as video cameras, scanners, and visualizers. Each user participating in the shared workspace may simultaneously and individually use the computer cursor to point to specific objects within the shared computer screen workspace. Its applications include (1) joint editing of word processing files or spreadsheets so as to enable users at different locations to work on the same material jointly; (2) overlaying of video scenes with simulated images as in many military aircraft weapons and guidance systems; and (3) overlaying of computer generated and video images for comparing and preparing sketches, animations, and designs. The computer overlay concept may also be simplified so that one user may display their individual image in each and every of the shared workspaces so that each of the users may simultaneously point to objects within the shared workspace.

There are several limitations in the shared computer workspace system. First, the quality of the overlaid image is neither sharp nor stable enough to support sharing detailed documents. Also, digitizing and overlaying of the shared images in competing technology is much more complex and costly than when using simple video technology components in the manner specified in this application. Therefore, a drawing, diagram, or picture which exhibits detail that a user wishes to discuss may not appear clearly enough within the screen image to do so. Second, when three or more users are sharing a workspace, the overlapped image becomes crowded and confused, and identifying the owners of objects within a shared workspace becomes difficult. Identification may be improved by dimming the overlay signal electronically; however, this leads to a degradation of the picture quality. Finally, when a displayed image in the shared workspace is scrolled or moved, the spacial relationship between the overlaid layers is destroyed. Thus, a number of significant advantages of using a video signal are lost in the shared workspace concept.

In other applications, such as sportscasting, it is common to take a recorded video signal and replay it while mixing an overlay of a pointer and/or a marker. Such an application demonstrates the value of pointing and marking within video images, but this stand-alone technology does not reveal how to enable two-way pointing and/or marking at both sites in a video teleconference system. An example of such a teleinteractive system might be returning a video signal with a pointer and/or marker overlaid to point at and show NASA astronauts which button to push on their console in reply to a question. After using and experiencing this simple but useful new function, the user will envision any number of useful applications and will want this functionality at any teleconference site.

Furthermore, video teleconference systems are often provided in a number of applications as turnkey systems comprising a self-contained unit resident at a site. The turnkey systems generally include one or a number of monitors, one or a number of video imaging devices (such as video cameras or video recorders), sound recording componentry, optional compression and decompression circuitry, and data transmission components for sending and receiving a video signal. However, none of the above described turnkey systems enable a user to remotely point and/or mark within a video signal originating at a remote location.

Therefore, it is an object of this invention to provide a system and method for video teleconferencing in which any conferee may point at and/or mark within any other video image, whether local or remote. It is a further object of this invention that any number of conferees individually and simultaneously may point within any video teleconference image. It is yet a further object of this invention to provide a very simple and low cost method to implement this basic, useful function within teleconference systems.

SUMMARY OF THE INVENTION

In light of the foregoing objects, there is provided, according to the present invention, a teleinteractive video teleconferencing system whereby each and every user may individually and simultaneously point within any video image transmitted as part of the video teleconference.

According to a first aspect of this invention two video teleconference sites are provided each including a local imaging means, such as a video camera, VCR, laser disk player, or visualizer; a switching device to select the video image to be viewed at the local teleconference site; a pointer overlay device to selectively overlay a pointer onto the video image selected for viewing; signal splitting means to split the selected overlaid video image for transmission to a local TV monitor and to a remote video teleconference site; send and receive interface components to transmit and receive video and audio signals from the remote teleconference site; and signal splitting means to split the video signal sent from the remote video teleconference site to a local TV monitor and switching circuitry. To effectuate teleinteractive video teleconferencing, a conferee selects for output through the switching device the incoming video signal received from the remote teleconference site. The signal is then overlaid by the local conferee so that an active pointer points within that video image, which is displayed on a local TV monitor as well as transmitted for viewing to the remote video teleconference site.

It is a second aspect of this invention that each and every video conferee is able to point within each and every video image, regardless of the video teleconference site from which that image originates. Thus, the number of pointers actively pointing within a video image may be in direct accordance with the number of participating video teleconference sites.

It is yet another aspect of this invention that a conferee may adjust the positioning of the video imaging device to effectuate both horizontal pan, vertical tilt, and zoom of the video imaging device. Such positioning may be carried out by mounting a positioning device to the neck or mounting stand of the video imaging device, and may be controlled by an automated means interposed between the conferee and a positioning device.

It is yet another object of this invention to provide an automated positioning device which is responsive to the position of one of the overlaid pointers, to be decided by some form of arbitration means. The positioning device being responsive to the position of the pointer within the video image, as the pointer approaches the boundary of the displayed video image, position control signals are generated to adjust the imaging device in a direction of the controlling pointer as viewed on a TV monitor.

These and other aspects, objects and advantages of the present invention will be better understood by reading the following detailed description in conjunction with the accompanying drawings and appended claims.

BRIEF DESCRIPTION OF THE DRAWINGS

The drawings form an integral part of the description of the preferred embodiment and are to be read in conjunction therewith. Like reference numerals designate like components and different figures, and because of the nature of this specification, a prime or letter may be appended to a reference numeral to designate like components within the same or other drawings, where:

FIG. 5 depicts yet another application of the teleinteractive video teleconference system where a first conferee points within an image captured at a local site and a second conferee at a remote site points within the same image;

FIG. 6 depicts a teleinteractive video teleconference system shown in FIGS. 1 and 3–5 with the added functionality of enabling a teleconference adjust the field of view of the video imaging device at the local site;

FIG. 7 depicts a teleinteractive video teleconference system depicted in FIG. 6 with the added functionality of enabling any conferee to adjust the target area of a video imaging device at any teleconference site;

FIG. 8 depicts another embodiment of this invention in which more than three teleinteractive video teleconference sites comprise the video teleconference system; and FIG. 9 depicts one application of the teleinteractive video teleconference site depicted in FIG. 8 where a teleconference points within a video image captured at a remote video teleconference site.

DETAILED DESCRIPTION OF THE PREFERRED EMBODIMENT

Figure 1:
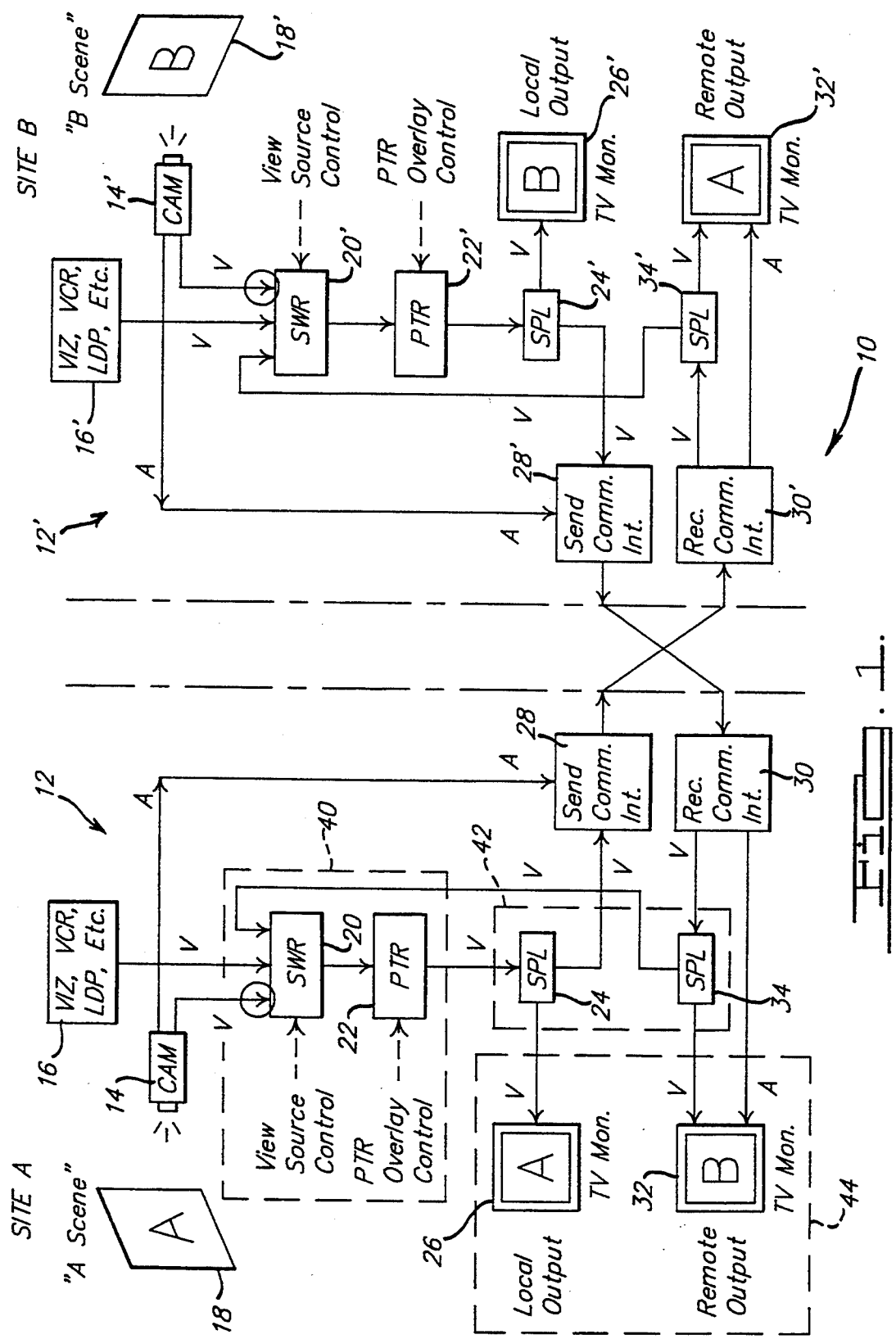
FIG. 1 is a functional block diagram of the teleinteractive video teleconference system for a two site video teleconference arrangement.

FIG. 1 depicts a teleinteractive video conferee system 10 which is comprised of a first site 12, to be designated herein as A, and a second site 12', to be designated herein as site B. It should be noted from the outset that the terms local and remote will be referenced often, and are strictly relative terms which describe the position of one conferee relative to a teleinteractive video teleconference site (a site). For example, a conferee located at site 12 is local to site 12 and remote to site 12'. Similarly, a conferee located at site 12' is considered local to site 12', but remote to site 12. Furthermore, because of a large degree of symmetry between each of the sites, elements within the site A will be designated by a reference numeral and like elements within the site B will be designated by the same reference numeral followed by a prime (') in order to minimize confusion between the same elements at different sites.

A site generally consists of one or a number of imaging devices which capture images for transmission to a remote site. For example, the sites depicted herein include a video camera 14, 14' which may be directionally aimed to capture images of a local conferee's choosing. Alternatively, the video imaging device may consist of any of a number of visualizers, VCR's, laser disk players (LDP), or any device capable of outputting an acceptable video signal. These devices are represented herein as block 16, 16'. A visualizer is an apparatus which enables the viewing of documents and comprises a stand or foundation on which a camera is mounted to point down towards a target area and generally includes enhanced lighting capability to provide a clear, sharp picture of the document to be viewed. The video imaging devices collectively capture what is defined as a target space which is the field of view captured by any of the video imaging devices. In FIG. 1, the target space or scene 18, 18' is captured by video camera 14, 14', respectively. Video cameras 14, 14' also output an audio signal A in addition to the video signal V.

The outputs from the video imaging devices are input to selectable switching device 20, 20' which selects for output one of the video signals input into switching device 20, 20'. A video signal output from A remote teleconference site is to be later described in further detail herein, also input into switching device 20, 20'. Switching device 20, 20' is conferee selectable through a view source control which directs switch device 20, 20' to selectively output one of the video signals input to it. The output of switch device 20, 20' is input into a pointer overlay device 22, 22' which overlays the video signal output from switch device 20, 20' with a pointer which allows the local conferee to point within the video image output from switching device 20, 20'. The local conferee may first activate and then move the pointer in the x-y direction using the PTR overlay control. For example, if the conferee wishes to designate a specific object in the video image output by switching device 20, 20', the conferee would use the pointer overlay control and the pointer overlay device 22, 22' to position the pointer.

The output from pointer overlay control 22, 22' is input into a video signal splitter 24, 24' which receives an incoming video signal and splits that signal to produce two video signals one of which is output for viewing on a television monitor 26, 26', and the other of which is sent to send communication interface 28, 28' for transmission to a remote teleconference site. Send communication interface 28, 28' receives video signal V and audio signal A and may optionally perform data compression for more efficient transmission of the video signals or merely transmit them to remote teleconference sites. The signals output by communication interface 28, 28' are received at remote teleconference site by receive communication interface 30, 30'. Receive communication interface 30, 30' performs any data decompression which may be necessary to decompress the transmitted data received from send communication interface 28, 28'.

In addition to any signal decompression which may occur, receive communication interface 30, 30' outputs an audio signal which is input to TV monitor 32, 32'. Receive communication interface 30, 30' also outputs a video signal which is input to signal splitter 34, 34'. Signal splitter 34, 34' splits the incoming video signal V for output to TV monitor 32, 32' and for output to switch device 20, 20'. TV monitor 32, 32' thus displays the same video signal as is displayed on TV monitor 26', 26, respectively. Each site 12, 12a has the capability of displaying the image captured by the video imaging device at the local site and also has the capability of displaying the images captured by the imaging devices at the remote teleconference site.

A primary inventive aspect of this invention is the usefulness of splitting the incoming video signal received from a remote site using signal splitter 34, 34'. When the incoming video signal from receive communication interface 30, 30' is split and input to switching device 20, 20', a local conferee may view on TV monitor 32, 32' the same video image viewed by a remote conferee, and with the other output of signal splitter 34, 34' being input into switching device 20, 20', a conferee may also selectively view and point and/or make an erasable mark within the images captured by a remote site's video imaging device. Note that all instances of pointing and marking will hereinafter generally be referred to as pointing within an image but such references include pointing and/or marking within a video image. To do so, the conferee would selectively choose as an output from switching device 20, 20' the video signal input from signal splitter 34, 34'. The output of switching device 20, 20', which is actually a video signal captured by the remote site's video imaging device, is then input into pointer overlay device 22, 22'. This enables the remote conferee to actively point within that video image from captured at A local site.

Many of the components described herein may be combined and defined in terms of functional subsystems. For example, switching device 20 and pointer overlay device 22 are functionally combinable to define pointer overlay subsystem 40, whereby switching device 20, 20' determines the particular image to be displayed, and pointer overlay device 22, 22' will effectuate that pointing within that image. Signal splitter device 24, 24' and signal splitter device 34, 34' may operatively be combined to form splitting network 42. Similarly, TV monitor 26, 26' and TV monitor 32, 32' may functionally be combined to define monitor subsystem 44. It should be noted that for each figure to be discussed later herein, similarly referenced components may be combined to define the same functional subsystems as are defined in FIG. 1, site 12. For purpose of clarity and lack of repetition, these subsystems will only be defined in FIG. 1, but are equally applicable to all figures described herein which depict teleconference systems.

Figure 2:
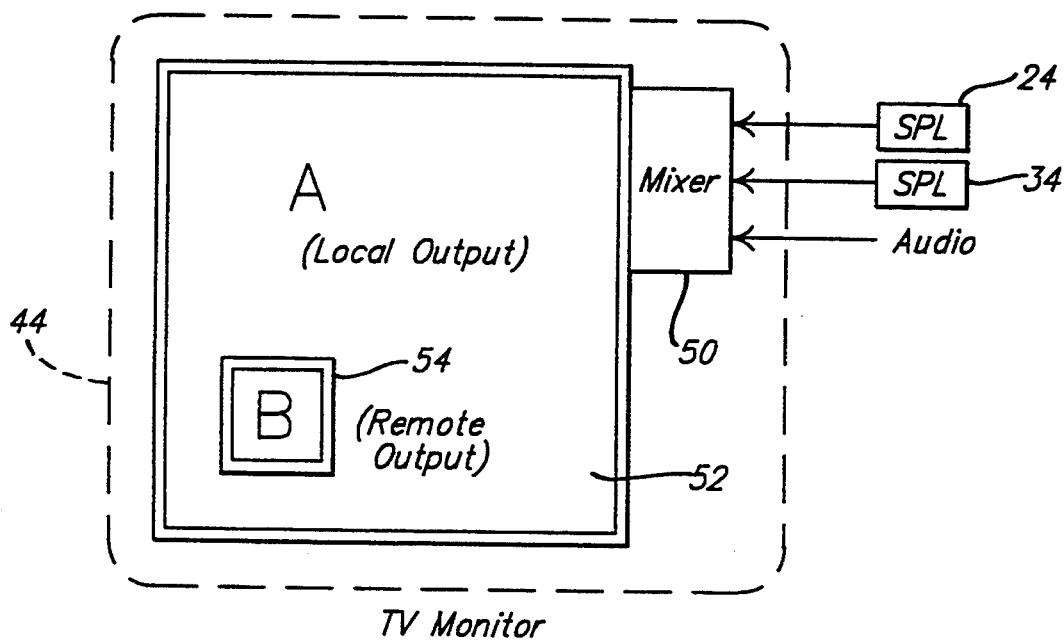
FIG. 2 is an alternate embodiment of a two monitor teleinteractive video teleconference arrangement depicted in FIG. 1, wherein a dual input monitor with picture-in-picture capability is used to simulate two or more monitors.

FIG. 2 shows an alternate embodiment for monitor subsystem 44 defined in FIG. 1. In this embodiment, rather than two monitors being used to present the images captured by the local and remote imaging devices, one intelligent monitor with picture-in-picture capabilities displays the local and remote video images. Such dual or multiple input monitors are well known in the art and are commonly used in video technology. Inputs to monitor subsystem 44 are as defined in FIG. 1. The output from signal splitter 24 and the output from signal splitter 34 are input to intelligent mixer 50, which is responsive to local conferee control, to produce an image on display 52 that includes a local output comprising the entire screen of display 52 and a picture-in-picture output 54 comprising a video display captured at the remote location. Mixer 50 may optionally have the capability to enable a local conferee to optionally display images captured at a remote site to comprise the entire video screen and images captured at the local site to appear in picture-in-picture display 54. Furthermore, picture-in-picture display 54 may optionally be positioned in any number of locations within display 52, depending on conferee preference. Also input to monitor subsystem 44 in FIG. 2 is the audio portion transmitted from a remote video teleconference site. The embodiment of monitor subsystem 44 depicted in FIG. 2 can be substituted wherever video images for more than one location need to be displayed. For clarity and brevity, this option will not be displayed in other Figures presented herein, but it should be kept in mind that such a substitution could easily occur.

Figure 3:
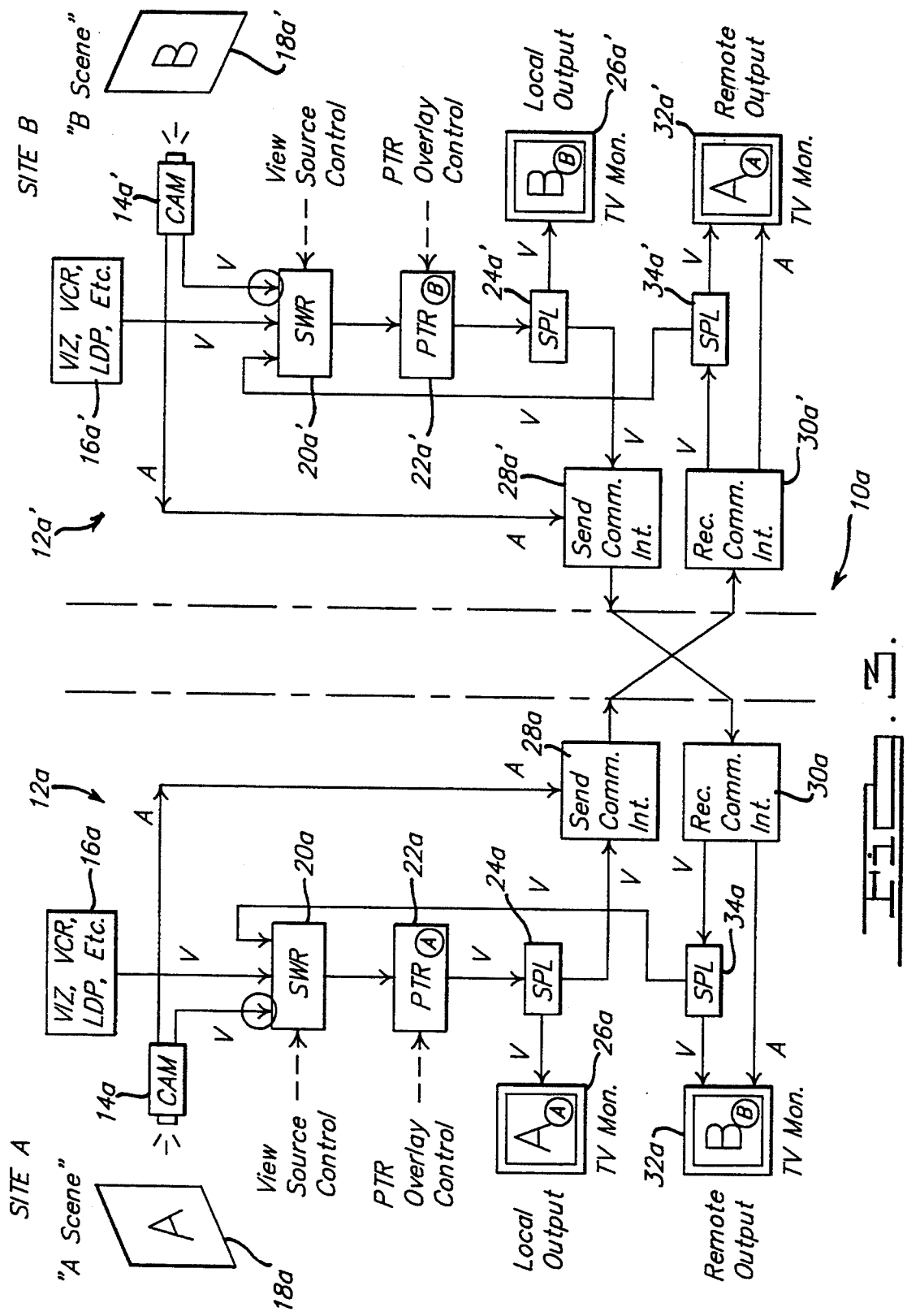
FIG. 3 depicts one application of the teleinteractive video teleconference system where each local conferee points to an image captured at their respective local teleconference site.

FIG. 3 depicts one application of the video teleconference system described in FIG. 1. The components defining the system disclosed in FIG. 3 are identical to those disclosed in FIG. 1, but it is the local conferee selections with regards to the switching device 20a and pointer overlay 22a device which differentiates FIG. 3 from FIG. 1. Also note that the components are similarly numbered with the exception that in order to positively identify a component, the letter "a" is appended to all reference numerals in FIG. 3 for those components which correspond to similar components of FIG. 1. This convention will be maintained throughout the remainder of the specification, adding on successive letters as reference numeral suffixes.

In FIG. 1, the selected output from switching device 20, 20' is the input from the local video camera 14, 14'. Furthermore, as depicted in FIG. 1, no pointer overlay control is implemented using pointer device 22, 22'. FIG. 1 essentially depicts a video teleconference system in which TV monitor 26, 26' displays the video image captured by video camera 14, 14', and TV monitor 32, 32' displays the video image captured video cameras 14', 14, which are remote to that particular teleconference site. Thus, TV monitor 26 displays scene A 18 captured by video camera 14 and TV monitor 26' displays scene B 18' captured by video camera 14'. TV monitor 32 displays scene B captured by video camera 14' which is remote to TV monitor 32, and TV monitor 32' displays scene A captured by video camera 14 which is remote to TV monitor 32'.

In FIG. 3, switching device 20a, 20a' is switched so that its output is the video image captured by video camera 14a, 14a', respectively. In this particular application, pointer overlay device 22a, 22a' is activated so that each conferee at site A 12a, 12a' may control a pointer within the video image captured by the video imaging device local to each conferee. Thus, TV monitor 26a, 26a' displays pointer the image captured by camera 14a, 14a' A, B, respectively. This is represented in FIG. 3 by placing within pointer overlay device 22a, 22a' a circled letter which represents a pointer and the conferee controlling that pointer. Site 12a is represented by A and site 12a' is represented by B. Thus, video teleconference site 12a displays scene A 18a on monitor 26a, and the conferee at site 12a has overlaid and controls a pointer within that video image. Similarly, teleconference site 12a' displays scene B 18a' on monitor 26a', and the conferee at site 12a' has overlaid and controls a pointer within that video image. FIG. 3 depicts the situation where each conferee is pointing within a video image captured by a local video imaging device, in this case video camera 14a, 14a'. Each conferee is able to view and point within the video image captured at their respective site and is also able to view the scene captured remotely including the remote conferee's pointer within that image.

Figure 4:
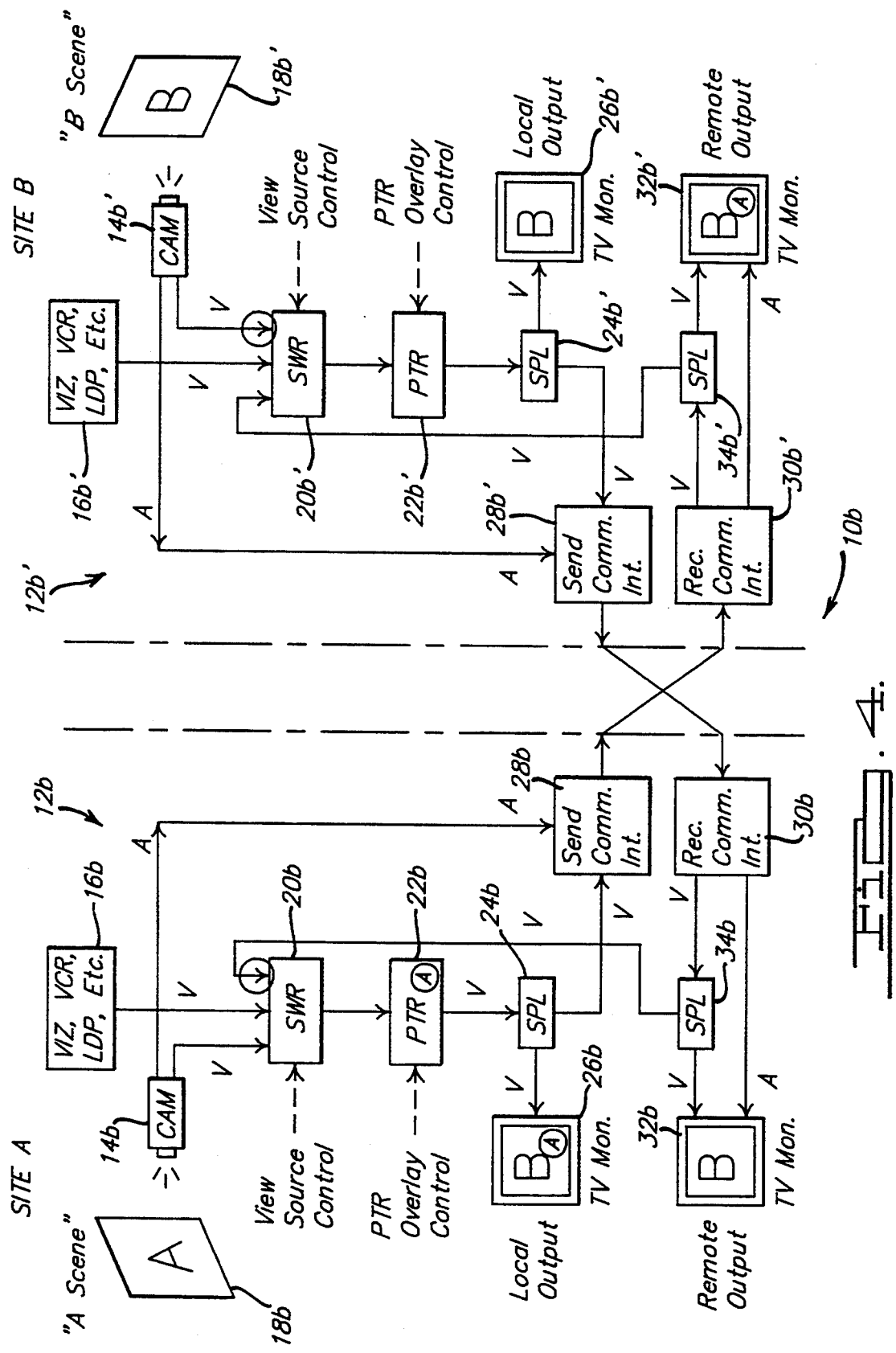
FIG. 4 depicts yet another application of the teleinteractive video teleconference system where a conferee points to an image captured at a remote site.

FIG. 4 depicts another utilization of the teleinteractive video teleconferencing system defining a particularly inventive aspect of this system. Once again, like components are similarly numbered except that similar components are suffixed with a "b". At remote site 12b', switching device 20b' selects for output the video signal from camera 14b', as indicated by the circle around the input into switching device 20b' from video camera 14b'. As there is no encircled B in the pointer overlay device 22b', pointer overlay control for remote video site 12b' is deactivated. Thus TV monitor 26b' and local TV monitor 32b display the video image captured by video camera 14b'.

Switching device 20b at the other teleconference site 12b selects the output from signal splitter 34b which is the remote video image captured by video camera 14b'. This is indicated by the circle at switching device 20b around the input line from signal splitter 34b. The output from switching device 20b is input to pointer overlay device 22b which is activated as indicated by the encircled A. Thus the conferee at video site 12b is able to move the pointer within the video image captured by video camera 14b' at remote site 12b'. This signal is then split by signal splitter 24b and may be displayed on monitor 26b and also transmitted to remote teleconference site 12b' for display on TV monitor 32b'. Thus, both conferees are able to view the video image captured by video camera 14b' and also view a pointer controlled by the conferee at site 12b. The image in which the pointer appears is displayed in TV monitors 26b and 32b'.

An enhanced version of the concept of a remote conferee teleinteractively pointing at a video image captured at a remote teleconference site is depicted in FIG. 5. The arrangement of FIG. 5 differs from that of FIG. 4 only in that pointer overlay device 22c' is activated to overlay a pointer onto the video image captured by video camera 14c'. Thus, rather than simply having the conferee of site 12c point at the video image captured by video camera 14c', the conferees of both video sites may simultaneously point to a video image captured by video camera 14c'. Monitors 26c and 32c' both display the resulting video image when the teleinteractive video teleconferencing system 10c is utilized in this manner. The dual pointer display is effectuated when the conferee of site 12c selects as output from switching device 20c to be the output sent to local site 12c from remote site 12c'. Thus, remote pointer B is overlaid using pointer overlay device 22c', then local pointer A is overlaid using pointer overlay device 22c to render the video image displayed in monitors 26c and 32c'.

FIG. 6 is generally a similar arrangement to that depicted in FIG. 1 with switching device 20d, 20d' selecting for output to pointer device 22d, 22d' the output received from video cameras 14d, 14d'. However, the embodiment depicted in FIG. 6 also has the added functionality of enabling the conferee at site 12d, 12d' to position the video camera 14d, 14d'. Mounting directional control devices 35d, 35d' position to the mounting neck (not shown) of video cameras 14d, 14d'. This will enable an conferee to pan camera 14d, 14d' in a horizontal direction and tilt in a vertical direction. Directional control device 35d, 35d' may be any of a variety of apparatuses known in the art. View directional control could be hard wired to direction control device 35d, 35d' or, alternatively, an infrared remote control unit could effectuate the view directional control commands. Variable positioning of video camera 14d, 14d' enables scanning flexibility in selecting a target area for display. With this capability, a number of displays such as that depicted in TV monitors 26d and 30d' and TV monitor 32d and 28d' are possible. FIG. 7 depicts an enhanced version of the embodiment depicted in FIG. 6 that includes not only directional control of video camera 14e, 14e' by a local conferee, but also enables a remote conferee to control the positioning of a remote video camera. This enables the conferee to control the video camera at their location and also the video camera at a remote location. To effectuate such a system, an electronic interface such as a computer 36e, 36e' is interposed between the view directional control and directional control device 35e, 35e'. Interlinking the computers at each video teleconference site is a network interface 37e, 37e' which sends and receives direction control signals to and from local and remote locations as well as functions as an arbitrator between teleconference sites simultaneously attempting to position a video camera. With respect to switching device 20e, 20e' and pointer overlay device 22e, 22e', these devices are arranged in the same manner as described with respect to FIG. 4. In FIG. 7, the pointer control device 22e of teleconference site 12e is activated and switching device 20e selects for output the video signal from remote site 12e'. The conferee at local site 12e resultantly points within the video image captured by video camera 14e', and this image with pointer is also displayable to remote teleconference site 12e' on TV monitor 32e'.

The concept of remotely controlling an imaging device at a remote teleconference site may easily be extended to incorporate use of the pointer overlay control to direct the positioning of a remote video camera. For example, computer 36, 36' can monitor the position of a pointer relative to the video image in which it is displayed. When the pointer approaches the boundary of a video image, computer 36e, 36e' could detect the pointer's proximity to the boundary of the video image and generate view direction control commands which position the remote video camera in order to center the pointer in the image. If more than one pointer appears in a displayed video image, network interface 37e, 37e' could include a variety of arbitration methods to distribute control of the video camera whose image is being displayed. Such arbitration means could include awarding first priority to the local conferee or, alternatively, control could be awarded on a first-come-first-served basis to the first conferee to introduce pointer overlay control.

The system depicted in FIG. 8 is an augmentation of the system depicted in FIG. 1, where three sites rather than two comprise the teleconference system. To implement the system depicted in FIG. 8, the system must be augmented by a video monitor 38f, 38f', 38f'', one additional signal splitter 39f, 39f', 39f'', and one additional receive interface 40f, 40f', 40f'' per each additional site, and switching device 20f, 20f', 20f'' must be enlarged to accommodate one additional input. In this way, audio and video signals originating new site may be received by all conferees, and when desired, any site may overlay their pointer onto the video signal of another site. Augmentation is applicable to greater than one site and would merely require that an additional signal splitter, receive interface, and monitor must be added to each site for each teleconference site that is added to the system, and the switching device must also be enlarged accordingly. Furthermore, rather than using an additional monitor, the picture-in-picture concept of FIG. 2 may easily be extended to incorporate more than two video signals. Thus, referring to FIG. 2 mixer 50 must be augmented by one video input line for each teleconference site added to the system. Mixer 50 must also be able to generate the requisite number of picture-in-picture displays 54 to accommodate additional teleconference sites. Thus, with a sufficiently intelligent mixer 50, significant cost reductions may be realized by not having to adding monitors in accordance with the number of teleconference sites added to the system.

FIG. 9 depicts one application of the teleconference system 10 depicted in FIG. 8. In teleconference site 12g switching device 20g is selectively controlled to output to pointer overlay device 22g the output from video camera 14g'' from teleconference site 12g''. Sites 12g' and 12g'' will thus display in TV monitors 32g'' and 32g'', respectively, the video image originating from site 12g'', but will also display the pointer overlaid by local site 12g. Note that if the conferee of site 12g' were to set switching device 20g' to select the input from site 12g'', it would be possible for all three pointers to be overlaid on the image captured by video camera 14g''. Teleconferencing system described in FIGS. 8 and 9 will thus enable a great number of users to simultaneously participate in teleconference in which each teleconference site is able to point at any of the images captured by the imaging devices by remote teleconference sites. Note that view direction control of camera 14g, 14g', 14g'' is equally applicable to the drawings of FIG. 8 and 9 by merely adding directional controllers as shown in FIG. 6 and 7. Furthermore, directional control of a remote imaging device may easily be accomplished by applying the concepts taught in FIG. 7. Thus, a multi-user teleinteractive video teleconferencing system, including all of the features and benefits incorporated in FIGS. 1–7, may be applied to such a multi-user video network.

Each of the systems presented in FIGS. 1–9 may generally be implemented as a turnkey video teleconference system. A turnkey system presents to the conferee a complete system and alleviates the need to bundle a variety video components in order to create a complete video teleconference system. Furthermore, the use of such a turnkey system simplifies site-to-site interconnection, as various data compression and data decompression as well as data transmission and reception protocols may be predetermined and implemented in advance. This increases the ease of installation and operation for the user because only a minimal technical knowledge is required for installation and use. Thus, a very useful, low cost, and simple method and apparatus for teleinteractive remote video teleconferencing is presented.

It is to be understood that the invention is not limited to the exact construction illustrated and described above, but that various changes and modifications may be made without departing from the spirit and scope of the invention as defined in the following claims.

What is claimed is:

1. In a teleconference system in which images originating at a first teleconference site are displayed at a second teleconference site and images originating at a second teleconference site are displayed at said first teleconference site, a system for teleinteractively pointing within an image displayed at a site local to a conferee that originated at a site remote to said conferee, comprising:
    at least one local imaging means to capture images within a target space at said local site;
    at least one remote imaging means to capture images within a target space at said remote site;
    at least one local display means to display images captured by said local imaging means and images captured by said remote imaging means;
    at least one remote display means to display images captured by said remote imaging means and images captured by said local imaging means;
    switching means at said local site for selectively designating for output from said local site one of a plurality of video images input to said switching means, said plurality of video images including said images captured at said local site and said images captured at said remote site;
    switching means at said remote site for selectively designating for output from said remote site one of a plurality of video images input to said switching means, said plurality of video images including said images captured at said remote site and said images captured at said local site;
    selectively activated pointer means at said local site where said pointer is directed by a local conferee to point within the selected output image designated by said local switching means to define a local pointer-overlaid image;
    selectively activated pointer means within said remote site where said pointer is directed by a remote conferee to point at the selected output image designated by said remote switching means to define a remote pointer-overlaid image;
    signal splitting means at said local site to enable display of said local pointer-overlaid image on said local display means and on said remote display means; and
    signal splitting means at said remote site to enable display of said remote pointer-overlaid image on said remote display means and on said local display means.

2. The apparatus defined by claim 1, further comprising:
    a selectively activated local marker means associated with said local pointer means where a local mark is overlaid upon said local pointer-overlaid image in accordance with movement of said local pointer means, said local mark being erasable; and
    a selectively activated remote marker means associated with said remote pointer means where a remote mark is overlaid upon said remote pointer means where a remote mark is overlaid upon said remote pointer-overlaid image in accordance with movement of said remote pointer means, said remote mark being erasable.

3. The apparatus defined by claim 1, wherein each of said local and remote imaging means may include at least one of a video camera, video-cassette recorder, laser disk player, photo compact disk player, or document visualizer.

4. The apparatus defined by claim 1, wherein each of said local and remote display means includes video monitors.

5. The apparatus defined by claim 1, wherein each of said local and remote display means includes a monitor with picture-in-picture capability and said monitor displays both said local and remote images.

6. The apparatus defined by claim 1, wherein the target space at said local site comprises a field of view of one of a video camera, a document visualizer, a video-cassette recorder, laser disk player, or a photo compact disk player output signal.

7. The apparatus defined by claim 1, wherein the target space at said remote site comprises a field of view of one of a video camera, a document visualizer, or a video-cassette recorder, laser disk player, or a photo compact disk player output signal.

8. The apparatus defined by claim 1, further comprising:
    local directional control means for positioning said local imaging means, where said local directional control means is responsive to local directional control signals generated by one of said local conferee or said remote conferee; and
    remote directional control means for positioning said remote imaging means, where said remote directional control means is responsive to remote directional control signals generated by one of said remote conferee or said local conferee.

9. The apparatus defined by claim 8, further comprising:
    arbitration means to distribute control of said local directional control means between said local and said remote conferees; and
    arbitration means to distribute control of said remote directional control means between said local and said remote conferees.

10. The apparatus defined by claim 8, wherein said local directional control signal is responsive to one of said local pointer means or said remote pointer means to define a designated local control pointer wherein said local directional control means positions said local imaging means in the direction of said designated local control pointer when said designated local control pointer substantially approaches a target space boundary of said local image, and said remote directional control signal is responsive to one of said remote pointer means or said local pointer means to define a designated remote control pointer wherein said remote directional control means positions said remote imaging means in the direction of said designated remote control pointer means when said designated remote control pointer substantially approaches a target space boundary of said remote target image.

11. The apparatus defined by claim 10, further comprising:
  arbitration means to distribute control of said local directional control means between said local and said remote conferees; and
  arbitration means to distribute control of said remote directional control means between said local and said remote conferees.

12. In a teleconference system in which images originating at a first teleconference site are displayed at a second teleconference site and images originating at a second teleconference site are displayed at said first teleconference site, a system for teleinteractively pointing within an image displayed at a site local to conferee that originated at a site remote to said conferee, comprising:
  at least one local imaging means to capture images within a target space at said local site;
  at least one remote imaging means to capture images within a target space at said remote site;
  at least one local display means to display images captured by said local imaging means and images captured by said remote imaging means;
  at least one remote display means to display images captured by said remote imaging means and images captured by said local imaging means;
  selectively activated pointer means at said local site where said pointer means is directed by a local conferee to point within a selected one of said local image and said remote image to define a local pointer-overlaid image, and said local pointer-overlaid image is displayable by said local and remote display means; and
  selectively activated pointer means at said remote site where said pointer means is directed by a remote conferee to point within a selected one of said remote image and said local image to define a remote pointer-overlaid image, and said remote pointer-overlaid image is displayable on said local and remote display means.

13. The apparatus defined by claim 12, further comprising:
  a selectively activated local marker means associated with said local pointer means where a local mark is overlaid upon said local pointer-overlaid image in accordance with movement of said local pointer means, said local mark being erasable; and
  a selectively activated remote marker means associated with said remote pointer means where a remote mark is overlaid upon said remote pointer-overlaid image in accordance with movement of said remote pointer means, said remote mark being erasable.

14. The apparatus defined by claim 12, wherein each of said local and remote imaging means may include at least one of video camera, video-cassette recorder, laser disk player, photo compact disk player, or document visualizer.

15. The apparatus defined by claim 12, wherein each of said local and remote display means includes video monitors.

16. The apparatus defined by claim 12, wherein each of said local and remote display means includes a single monitor with picture-in-picture capability and said monitor displays both said local and remote images.

17. The apparatus defined by claim 12, wherein the target space at said local site comprises a field of view of one of a video camera, a document visualizer, a video-cassette recorder, laser disk player, or a photo compact disk player.

18. The apparatus defined by claim 12, wherein the target space at said remote site comprises a field of view of one of a video camera, a document visualizer, or a video-cassette recorder, laser disk player, or a photo compact disk player.

19. The apparatus defined by claim 12, further comprising:
  local directional control means for positioning said local imaging means, where said local directional control means is responsive to local directional control signals generated by one of said local conferee or said remote conferee; and
  remote directional control means for positioning said remote imaging means, where said remote directional control means is responsive to remote directional control signals generated by one of said remote conferee or said local conferee.

20. The apparatus defined by claim 19, further comprising:
  arbitration means to distribute control of said local directional control means between said local and said remote conferees; and
  arbitration means to distribute control of said remote directional control means between said local and said remote conferees.

21. The apparatus defined by claim 19, wherein said local directional control signal is responsive to one of said local pointer means or said remote pointer means to define a designated local control pointer wherein said local directional control means positions said local imaging means in the direction of said designated local control pointer when said designated local control pointer substantially approaches a target space boundary of said local image, and said remote directional control signal is responsive to one of said remote pointer means or said local pointer means to define a designated remote control pointer means wherein said remote directional control means positions said remote imaging means in the direction of said designated remote control pointer means when said pointer means substantially approaches a target space boundary of said remote target image.

22. The apparatus defined by claim 21, further comprising:
  arbitration means to distribute control of said local directional control means between said local and said remote conferees; and
  arbitration means to distribute control of said remote directional control means between said local and said remote conferees.

23. In a video teleconference site in which local images originate at said site and are displayable at a remote teleconference site and in which remote images originating at said remote teleconference site are displayable at said teleconference site, an apparatus for interactively pointing within either of said local and remote images, comprising:

at least one imaging means to continuously capture said local images within a target space at said teleconference site;

at least one display means to display said local and said remote images;

switching means at said teleconference site for selectively designating for output from said teleconference site one of said local and remote images input to said switching means;

input signal splitting means for distributing an incoming signal from said remote teleconference site to said display means and to said switching means;

selectively activated pointer means where said pointer is directed by a teleconference conferee to point within the selected output image designated by said switching means to define a pointer-overlaid image; and output signal splitting means at said teleconference site to enable display of said pointer-overlaid image at said teleconference site and at said remote teleconference site.

24. The apparatus defined by claim 23, further comprising a selectively activated marker means associated with said pointer means where a mark is overlaid upon said pointer-overlaid image in accordance with movement of said pointer means, said mark being erasable.

25. The apparatus defined by claim 23, wherein said imaging means may include at least one of a video camera, video-cassette recorder, laser disk player, photo compact disk player, or document visualizer.

26. The apparatus defined by claim 23, wherein said display means includes video monitors.

27. The apparatus defined by claim 23, wherein said display means includes a monitor with picture-in-picture capability and said monitor displays both said local and remote images.

28. The apparatus defined by claim 23, wherein the target space comprises a field of view of one of a video camera, a document visualizer, or a video-cassette recorder, laser disk player, or a photo compact disk player.

29. The apparatus defined by claim 23, further comprising directional control means for positioning said imaging means, where said directional control means is responsive to directional control signals generated at one of said teleconference site and said remote teleconference site.

30. The apparatus defined by claim 29, further comprising arbitration means to distribute control of said directional control means between said teleconference site and said remote teleconference site.

31. The apparatus defined by claim 29, wherein said directional control signal is responsive to a designated one of said selectively activated pointer means or a pointer means at said remote teleconference site, the designated one defined as a designated control pointer, wherein said directional control means displaces said imaging means in the direction of said designated control pointer when said designated control pointer substantially approaches a target space boundary of said local image.

32. The apparatus defined by claim 31, further comprising arbitration means to distribute control of said local directional control means between said teleconference site and said remote teleconference site.

33. In a teleconferencing system in which a first set of images originating at a local teleconference site are displayable at a remote teleconference site and a second set of images originating at said remote teleconference site are displayable at said local teleconference site, an apparatus for teleinteractively pointing within at least one of said first or second set of images displayed at said local teleconference site, comprising:

switching means for selectively designating for output from said local teleconference site one of said images from said first set or said second set of video images input to said switching means;

input signal splitting means for distributing an incoming signal from said remote teleconference site to each of a display means and said switching means;

selectively activated pointer means where said pointer is directed by a teleconference conferee to point within the selected output image designated by said switching means to define a pointer-overlaid image; and output signal splitting means to enable said pointer-overlaid image to be displayed on the local teleconference site display means and to enable transmission to said remote teleconference site.

34. The apparatus defined by claim 33, further comprising a selectively activated marker means associated with said pointer means where a mark is overlaid upon said pointer-overlaid image in accordance with movement of said pointer means, said mark being erasable.

35. In a N-site teleconference system in which images originating at one of said N teleconference sites are displayed at each of said N teleconference sites and images originating at each of said N teleconference sites are displayed at a particular teleconference site, a system for teleinteractively pointing within an image displayed at a site local to a conferee that originated at a site remote to said conferee, comprising:

imaging means at each of said N teleconference sites to capture images within a target space;

at least one display means at each of said N teleconference sites to display images captured by said imaging means; and selectively activated pointer means at each of said N teleconference sites where said pointer means is directed by a local conferee to selectively point within a selected one of said images to define a pointer-overlaid image, and said pointer-overlaid image is displayable on each of said display means.

36. The apparatus defined by claim 35, further comprising a selectively activated marker means at each of said teleconference sites, associated with said pointer means at each of said N teleconference sites where a mark is overlaid upon said pointer-overlaid image in accordance with movement of said pointer means, said mark being erasable.

37. The apparatus defined by claim 35, wherein each of said imaging means may include at least one of a video camera, video-cassette recorder, or laser disk player, photo compact disk player, or document visualizer.

38. The apparatus defined by claim 35, wherein said display means includes video monitors.

39. The apparatus defined by claim 35, wherein said display means includes a single monitor with picture-in-picture capability and said monitor displays images from each of said teleconference sites.

40. The apparatus defined by claim 35, wherein the target space comprises a field of view of one of a video camera, a document visualizer, or a video-cassette recorder, laser disk player, or a photo compact disk player.

41. The apparatus defined by claim 35, further comprising directional control means at each of said N teleconference site for locally positioning said imaging means, where said directional control means is responsive to directional control signals generated by one of a local conferee or a remote conferee.

42. The apparatus defined by claim 41, further comprising arbitration means at each of said N teleconference sites to distribute control of a local directional control means between a remote conferee and said local conferee.

43. The apparatus defined by claim 41, wherein said directional control signal is responsive to one of a local pointer means or one of a remote pointer means to define a directional control pointer wherein said directional control pointer positions said imaging means in the direction of said directional control pointer when said pointer means substantially approaches a target space boundary of said image.

44. The apparatus defined by claim 43, further comprising arbitration means at each of said N teleconference sites to distribute control of said directional control pointer between competing conferees.

45. In a teleconference system in which images originating at a first teleconference site are displayed at a second teleconference site and images originating at a second teleconference site are displayed at said first teleconference site, a method for teleinteractively pointing within an image displayed at a site local to an operator that originated at a site remote to said operator, comprising the steps of:
 capturing video images within a target space at said local teleconference site;
 capturing video images within a target space at said remote teleconference site;
 displaying at each teleconference site said images captured at said local site and said images captured at said remote site;
 switchably selecting locally at each teleconference site for output one of said captured video images; and
 selectively activating locally at each teleconference site pointer means to overlay a pointer within said selected output image to define a pointer-overlaid video image.

46. The method defined by claim 45, further comprising selectively activating locally at each teleconference site marker means associated with said pointer means where a mark is overlaid on said pointer-overlaid video image in accordance with movement of said pointer means, said mark being erasable.

47. The method defined by claim 45, further comprising the step of splitting said pointer-overlaid video image resulting in a plurality of pointer-overlaid video images, one displayable at said local teleconference site and the other displayable at said remote teleconference site.

48. The method defined by claim 45, further comprising the steps of:
 providing a video imaging device at each teleconference site for capturing said video images;
 providing a means for positioning said video imaging device which is responsive to local operator control wherein said positioning means includes at least one of horizontal pan, vertical tilt, and zoom capabilities;
 positioning said video imaging device by a conferee local to a teleconference site to capture a plurality of varying target images.

49. The method defined by claim 48, wherein said positioning means is also responsive to remote operator control.

50. The method defined by claim 49, wherein said positioning means is responsive to operator control in accordance with said pointer-overlaid video image where when said pointer approaches a boundary of said video image, said positioning means is displaced in the direction of said boundary.

51. The method defined by claim 50, wherein said teleconference system includes arbitration means to distribute control of said remote positioning means to one of a plurality of competing requestors.

52. In a teleconferencing system in which images originating at one of N teleconference sites are displayable at each of said N teleconference sites, and images originating at each of said N teleconference sites are displayed at said one teleconference site, a method for teleinteractively pointing within any image displayed at a site local to an operator, comprising the steps of:
 capturing video images within a target space at each of said N teleconference sites;
 displaying at each of said N teleconference sites said captured images;
 switchably selecting for output at each of said N teleconference sites one of said captured video images; and
 selectively activating at each of said N teleconference sites pointer means to overlay a pointer within said selected output image to define a pointer-overlaid video image.

53. The method defined by claim 52, further comprising selectively activating at each of said N teleconference sites marker means associated with said pointer means where a mark is overlaid on said pointer overlaid video image in accordance with movement of said pointer means, said mark being erasable.

54. The method defined by claim 52, further comprising the step of splitting said pointer-overlaid video image signal resulting in a plurality of pointer-overlaid video images displayable at said N teleconference sites.

55. The method defined by claim 54, further comprising the steps of:
 providing a video imaging device for capturing said video images at each of said N teleconference sites;
 providing at each of said N teleconference sites a means for positioning said video imaging devices which is responsive to local operator control wherein said positioning means includes at least one of horizontal pan, vertical tilt, and zoom capabilities;
 positioning said video imaging device by a conferee local to a teleconference site to capture a plurality of varying target images.

56. The method defined by claim 55, wherein said positioning means is also responsive to remote operator control.

57. The method defined by claim 56, wherein said positioning means is also responsive to operator control in accordance with said pointer-overlaid video image where when said pointer approaches a boundary of said video image, said positioning means is displaced in the direction of said boundary.

58. The method defined by claim 57, wherein said positioning teleconference system includes arbitration means to distribute control of said remote positioning means between a plurality of competing requestors.

* * * * *